United States Patent
Eccleston

Patent Number: 5,149,176
Date of Patent: Sep. 22, 1992

[54] CONTROLLER FOR ELECTRIC BRAKING SYSTEMS

[75] Inventor: Larry Eccleston, Marshall, Mich.

[73] Assignee: Tekonsha Engineering Company, Tekonsha, Mich.

[21] Appl. No.: 563,505

[22] Filed: Aug. 7, 1990

Related U.S. Application Data

[63] Continuation-in-part of Ser. No. 390,617, Aug. 7, 1989, Pat. No. 5,050,937.

[51] Int. Cl.⁵ ............................................. B60T 13/72
[52] U.S. Cl. ................................. 303/20; 188/1.11; 303/7
[58] Field of Search .............. 303/7, 20, 24.1, 100, 303/92, 93, 105; 188/112 A, 112 R, 1.11

[56] References Cited

U.S. PATENT DOCUMENTS

| | | | |
|---|---|---|---|
| 2,228,631 | 1/1941 | Kuiper | 188/1.11 |
| 3,601,794 | 8/1971 | Blomenkamp | 303/105 |
| 3,738,710 | 6/1973 | Pokrinchak et al. | 303/20 |
| 3,780,832 | 12/1973 | Marshall | 303/7 |
| 3,908,782 | 9/1975 | Lang et al. | 180/103 |
| 3,909,075 | 9/1975 | Pittet, Jr. et al. | 303/24.1 |
| 3,953,084 | 4/1976 | Pittet, Jr. et al. | 303/24.1 |
| 3,955,652 | 5/1976 | Nilsson et al. | 188/112 R |
| 3,967,863 | 7/1976 | Tomecek et al. | 303/24.1 |
| 3,981,542 | 9/1976 | Abrams et al. | 303/24.1 |
| 3,981,544 | 9/1976 | Tomecek et al. | 303/24.1 |
| 4,030,756 | 6/1977 | Eden | 303/24.1 |
| 4,050,550 | 9/1977 | Grossner et al. | 188/112 R |
| 4,084,859 | 4/1978 | Bull et al. | 303/106 |
| 4,721,344 | 1/1988 | Frait et al. | 303/20 |
| 5,032,821 | 7/1991 | Domanico et al. | 303/108 |

*Primary Examiner*—Matthew C. Graham
*Attorney, Agent, or Firm*—Price, Heneveld, Cooper, DeWitt & Litton

[57] ABSTRACT

A vehicle brake controller includes a variable pulse-width modulator operating at a constant frequency and with a variable pulse width to provide control pulses to a MOSFET element which actuates vehicle braking. The controller further includes a visual indicator which displays different colors to representatively indicate the amount of current applied to the brakes, and also to indicate whether an operable connection exists between the electronic controller and the vehicle brakes.

11 Claims, 3 Drawing Sheets

CONTROLLER FOR ELECTRIC BRAKING SYSTEMS

CROSS-REFERENCE TO RELATED APPLICATION

This application is a continuation-in-part of prior application Ser. No. 390,617 filed Aug. 7, 1989, now U.S. Pat. No. 5,050,937.

BACKGROUND OF THE INVENTION

This invention relates to controllers for electrically-actuated braking systems, such as those used to apply the brakes on towed vehicles (i.e., trailers) in response to commands from the towing vehicle. More particularly, the invention relates to electronic controllers for braking systems of the general type just noted which operate in response to inertial sensors and/or manually-actuated switches or the like to energize the electric brake-actuation components of such systems in a particular controlled manner.

In the past, electric brake-system controllers have progressed from relatively simple and crude circuits which were little more than manually-variable power switches, operated directly by the driver, to various types of comparatively improved and more sophisticated systems which apply either continuous or pulsing drive excitation to the electromagnetic brake shoe actuators located at the trailer wheels. For example, U.S. Pat. No. 3,738,710 shows a series current regulator which integrates an actuation signal obtained from the towing vehicle brake light circuit and applies continuous braking excitation whose magnitude is basically proportional to the length of time the towing vehicle brakes are actuated, or in any event, proportional to the length of time the brake lights are energized in the towing vehicle. Most other control circuits for electric brakes apply pulsing excitation to the brake-actuating electromagnets, since it is widely thought that such pulsing excitation helps obviate lock-up or skidding of the trailer brakes. Some such controllers utilize a constant pulse-width applied at varying frequencies which increase in accordance with the amount of braking desired, while others utilize a constant-frequency variable-pulse-width form of excitation, for similar reasons. For example, see prior U.S. Pat. Nos. 3,909,075 and 3,953,084, addressed to the second such type of system, together with U.S. Pat. No. 3,967,863, which is directed to the first such type of system, all of which utilize both inertial-sensing and manually-actuatable input devices and apply braking excitation as a function of whichever such device is controlling.

While all of the aforementioned state of the art-type systems no doubt have their individual advantages and favorable features, most also involve certain characteristic limitations or undesirable characteristics. For example, continuous braking excitation is indeed likely to promote trailer brake lock-up, and that is a most undesirable event since it brings about a marked decrease in braking efficiency and loss of operator control. Further, the mere length of time during which the brake light circuit happens to be energized may very well not accurately represent the desirable magnitude of braking force to be applied to the trailer brakes in a given situation. On the other hand, where pulsating brake excitation is utilized, variable-frequency systems usually include some actuation frequencies which unfortunately complement or reinforce resonant frequencies in the vehicle braking systems (whether mechanical, electro-mechanical or electromagnetic in nature), with the result being instability, brake chatter, etc. Indeed, even pulse width-modulated (variable-pulse-width) constant-frequency systems sometimes utilize operational frequencies which have such adverse characteristics, and are likely to have other disadvantages as well.

One common incident of practically all state of the art electronic brake-system controllers is the fact that they utilize, and in fact require, interconnection with the vehicle brake light circuit. This is conventionally felt to be essential in such systems, because it is widely thought that the controller must be kept disabled, i.e., in a condition where it is not capable of providing braking excitation, except for the specific instances when either the manual control switch is actuated or else the towing vehicle brakes are actually being applied, as verified by the presence of the brake light signal. The main reason underlying this conviction is the fact that the stability of prior art inertial sensors and control circuits has not been sufficiently reliable under any and all potential operating conditions to preclude inadvertent and undesired brake actuation under various conditions, for example, in response to such extraneous effects as rough road surfaces, etc.

While using the tow vehicle brake light signal for the purpose just noted did prove to be a reasonably effective measure for coping with the problem of inadvertent brake actuation, this measure nonetheless created a number of problems itself, as well as involving at least some inherent uncertainties. For example, mechanical or electrical failure in the brake light circuit entirely extraneous to actual towing vehicle performance could result in the loss of all trailer braking. Furthermore, with the increasing sophistication of modern-day vehicles, the brake light circuit has grown increasingly complex, since it is now directly intercoupled with such other systems as electronic cruise controls, anti-skid braking systems, etc., and as a result each such system becomes more interdependent and subject to failure or malfunction caused by the others. Furthermore, while cruise controls, anti-skid braking systems, etc., are usually built into the tow vehicle at the factory, this is not true of trailer brake controllers, which are aftermarket devices installed by others. Thus, with the increasing complexity of vehicles and systems related to their brakes and brake-light actuation systems, it becomes increasingly more difficult, as well as more risky and potentially damaging, to physically breach the factory-installed wiring in order to interconnect the brake light circuit with aftermarket devices.

In addition, prior art electronic controllers for electric brake systems have had a number of other disadvantages and limitations, in particular operating inefficiencies attended by the use of excess power and the production of excess heat. Thus, typical prior art systems utilize resistive-type current-sensors for detecting the presence of excess braking current and initiating various forms of interruptors, for safety purposes, and to prevent controller burn-out. Further, state of the art controllers utilize inefficient drive components such as bi-polar power transistors and the like, thereby using excess power and requiring extensive heat-dissipation means, i.e., heat sinks.

BRIEF DESCRIPTION AND FEATURES OF THE PRESENT INVENTION

The present invention effectively resolves many, indeed most, of the problems described above which characterize prior art controllers. In accordance with the invention, new and more effective controllers are provided through the combined effect of a number of distinct features which vary in both concept and implementation from those found in prior art devices, and which combine synergistically to provide electronic brake controllers which are both more effective and more efficient than those utilized heretofore.

More particularly, the controllers of the present invention are both more stable and more responsive to important braking system criteria than prior controllers, and at the same time they are far more energy-efficient and cooler in operation, while also providing operational characteristics which avoid undesirable interaction with tow vehicle braking systems. More specifically considered, some of the more salient attributes of the present controllers include an optional new form of interface for interconnecting with the tow vehicle brake light circuit, new and novel variable-pulse-width fixed repetition rate circuits which operate at high efficiency, effectiveness, and stability, and a new form of braking current controller output driver (pass element) of high efficiency, coupled with new concepts in braking current detection and display, for increased operator awareness, effectiveness, and operational flexibility.

In a still more particular sense, the present invention provides a new form of electronic controller for electric braking systems which features a constant-frequency, variable-pulse-width modulator which interacts with the vehicle braking system through an N-channel power MOSFET, which is the control element for the braking current supplied to the electromagnets that actuate the brakes. The operational frequency for the controller is such as to avoid resonance problems in the braking assemblies of the trailer previously encountered in other systems, while at the same time facilitating efficient and effective component operation. The N-channel power MOSFET acting as the pass element has extremely low forward or "on" resistance, and improves the efficiency of the output stage by on the order of about ten times, in comparison to prior art systems, and circuit efficiency is further augmented by the implementation of a novel braking current-sensing technique, in which the voltage drop across the power MOSFET during conduction is sensed and used as a control signal, thereby eliminating the lossy and heat-producing series resistances utilized heretofore.

In accomplishing the foregoing goals, a novel power supply is utilized for driving the N-channel MOSFET, which constitutes a distinct departure from prior art electric brake controller concepts.

Furthermore, the controller in accordance herewith may optionally feature in combination with the aforementioned constant-frequency variable-pulse-width circuit operation, a new and novel MOSFET interface for interconnecting with the towing vehicle brake-light actuation circuit to avoid some of the significant problems and potential problems encountered by users and manufacturers in interfacing with the towing vehicle brake light circuitry.

The foregoing features and attributes of the invention will become more apparent after contemplation of the ensuing more detailed description, particularly when considered with and in light of the accompanying drawings.

DESCRIPTION OF THE PREFERRED EMBODIMENTS

Figure 1:
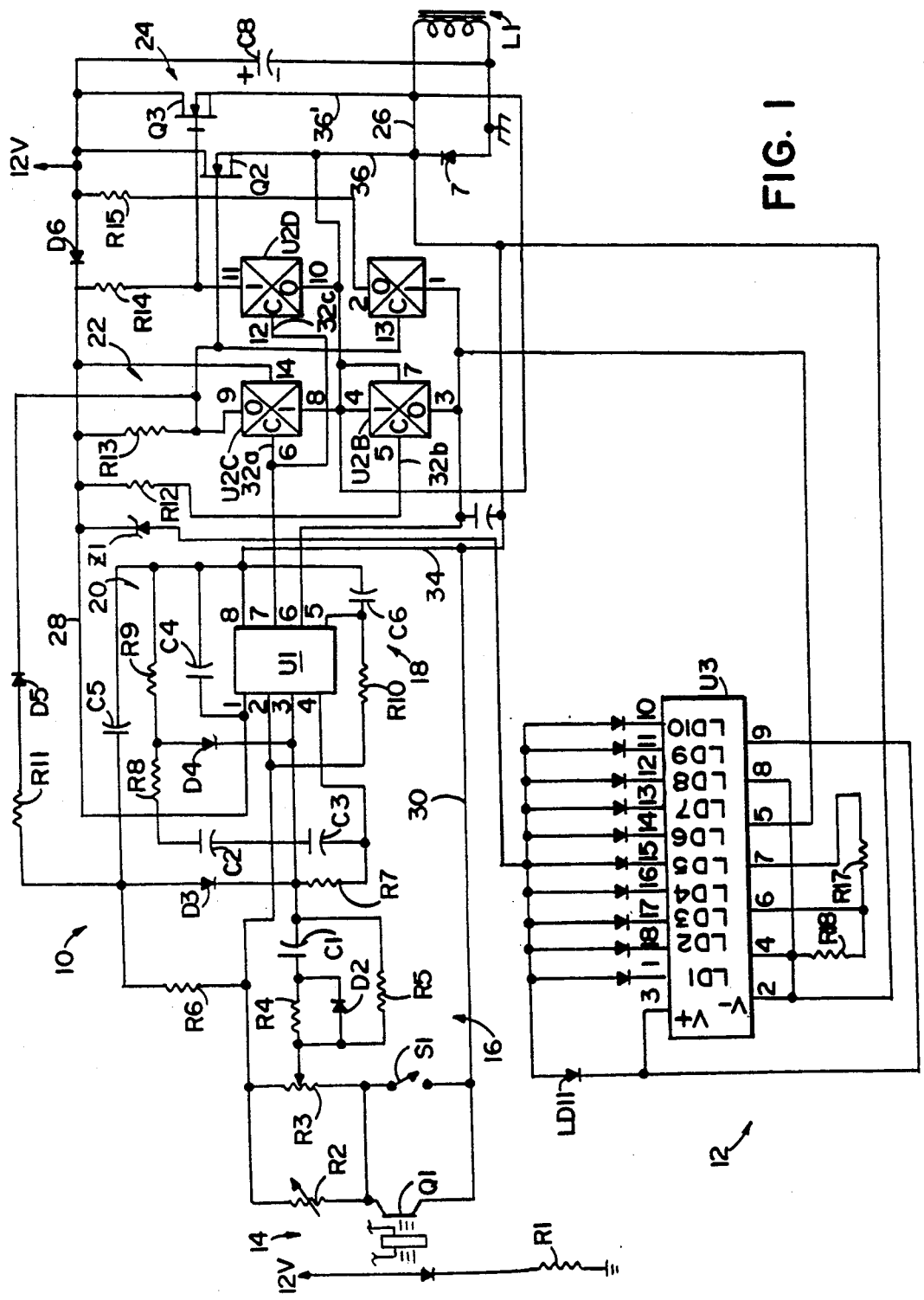
FIG. 1 is a schematic circuit diagram showing a first embodiment of an electronic controller in accordance with the invention.

Referring now to drawings, and the illustrative embodiments depicted therein, a first controller circuit is shown in FIG. 1, the upper portion of the circuit, designated generally by the numeral 10, comprises the braking current control portion of the circuit, while the lower portion, generally designated by the numeral 12, comprises the novel braking current display-generation means. Referring first to the braking current control portion of the circuit 10, the control circuit generally includes a detection and control portion 14 shown at the left and, proceeding toward the right, includes a dual-slope integrator section 16, a variable-pulse-width modulator 18 which includes an integrated circuit 20 and logic switch means 22 (both described in more detail hereinafter), and an output stage 24 comprising the aforementioned MOSFET elements, which may be single or double in form as described hereinafter. As shown, the output stage 24 has an output conductor 26 which comprises the connection to the towed vehicle (trailer) brake actuators, here symbolized by the large inductive winding labeled "L1," it being understood that in actual practice there will be a number of individual such inductances in parallel, each comprising the electromagnet which actuates one set of brakes at one wheel, all wheels usually being controlled simultaneously and in a substantially identical fashion.

With first reference to the detection and control portion 14 of the circuit 10, elements D1 and Q1 symbolize the signal-generating portions of the inertial sensor noted above, which is most preferably in accordance with that described in copending application Ser. No. 07/390,280, filed May 24, 1989. While an appropriate signal could, of course, be provided by other than electro-optical elements, the latter do provide a preferred embodiment of the invention, particularly in combination with the inertial sensor of the copending application just described. Thus, in a preferred embodiment, element D1 comprises an infrared light-emitting diode, and element Q1 comprises a corresponding phototransistor (both of which may desirably be implemented by use of Motorola components MLED 71 and MRD 701, respectively). As will be understood, the basic purpose of circuit portion 14 is to provide an analog control signal corresponding in magnitude to the extent of trailer braking desired, and thus an integral portion of circuit 14 is a manual switch S1, by which the towing vehicle operator may manually initiate measured braking effects on the trailer whenever desired, apart from the operation of the towing vehicle brakes and the corresponding inertial effects. In the most preferred embodiment in accordance herewith, switch S1 comprises a membrane-type "touch pad" switch of an appropriate commercially-available type, the use of which in such a braking controller is believed to constitute a novel and desirable feature in and of itself. Apart from this, however, it will be observed that both the inertial sensor components and the manually-actuated components are effectively coupled between mutually-shared supply and ground conductors 28 and 30, respectively, through potentiometers R2 and R3, respectively, with an interconnecting line 31 extending between the lower-voltage side of each such potentiometer. As will be understood, potentiometer R2 is merely for the purpose of adjusting the operational range of the phototransistor Q1, to avoid circuit performance variation as a function of manufacturing tolerances in the optical components. Potentiometer R3, on the other hand, comprises a gain control for the entire control circuit 10, since it acts to set the level at which signals from the detection portion 14 are provided to the integrator portion 16.

The dual-slope integrator 16 comprises basically capacitor C1, resistors R4 and R5, and diode D2; also, this integrating section works in conjunction with another integrating section comprising capacitor C3 and resistor R7, in a manner described more fully hereinafter. More particularly, the signal from the detection and control section 14 of the circuit is coupled from the movable contact of potentiometer R3 to the first integrating section just noted and, due to the polarity of diode D2, together with the operational characteristics of integrated circuit U1, this results in a comparatively slow and gradual increase in control voltage (determined in essence by the time constant established by both resistors R4 and R5, together with capacitor C1), but with a much faster discharge time (established, in essence, by the value of only resistor R5 and capacitor C1, resistor R4 having been shunted out of operation by diode D2). Preferably, the value of resistor R5 is on the order of only about fifteen percent of that of resistor R4, such that the charging time constant of the integrator is about 1.5 seconds, whereas the discharge time is about 0.1 second.

Integrated circuit U1 is utilized as a comparatively simple pulse-width modulator, and may be implemented by use of the commercial IC No. 5561, which basically includes an internal operational amplifier, comparator, and sawtooth wave generator. As utilized in the present application, the inverting input of the internal operation amplifier (pin 3) is coupled to integrator 16, in particular to the "low" side of capacitor C1, and to the common junction of resistor R7 and capacitor C3. The output of such internal "op amp" appears on pin 4, and is connected to the opposite common junction of capacitor C3 and resistor R7. It will be observed that positive operating voltage ("B+") for the entire control circuit 10 is provided on the aforementioned supply conductor 28 which, among other connections, is coupled to pin 1 of integrated circuit U1. As will be explained subsequently in more detail, control circuit 10 utilizes a "flying" power supply concept, in which conductor 30 functions as a floating ground, and it will be noted that the latter is coupled to pin 8 of IC U1 through conductor 34. The primary output from integrated circuit U1 appears on pin 7 thereof, and this is coupled to the logic switch means 22 by conductors 32 (and its interconnecting branches 32a, 32b, 32c, which are also connected to the B+ supply line 28 through resistor R12).

The logic switch means 22 may be implemented, in accordance with the embodiment here under discussion, by a four-part analog switch, e.g., the commercially-available element designated by the identifier "CD4066," the four operational components of which are illustrated separately for convenience in FIG. 1 and designated "U2a, U2b, U2c," etc. Basically, this compound switch operates in conjunction with the output from the pulse-width modulator (pin 7 of U1) to control conduction of the MOSFET output transistor Q2 (and, where higher levels of current are needed, a second such MOSFET designated here as Q3, which is to be understood as being optional, depending upon the level of current output needed).

As indicated previously, the output stages Q2 and Q3 are preferably N-channel devices, whose use in this environment is accomplished, in the embodiment under consideration, by use of a floating-ground "flying" power supply which, in effect, doubles the available power level, so as to make it possible to use N-channel MOSFET devices as output stages Q2 and Q3 (for example, by use of the commercially-available N-channel devices identified as #SMP50N05). Logic switch 22 thus functions as an integral part of this "flying" power supply by performing the necessary switching, in conjunction with a "pull-up" circuit comprising capacitor C8 and diode D7. As illustrated, these components are connected across output stages Q2 and Q3, and between twelve volt supply conductor 28 and the floating ground conductor 30, the latter in fact providing the excitation appearing on output conductor 26 noted previously, leading to the brake-actuation electromagnets L1.

Somewhat more particularly, the operation of control circuit 10 is as follows. Internally, the non-inverting input of the operational amp in integrated circuit U1 is tied to a 3.75 volt reference and, as noted above, the dual-slope integrator 16 connected between the detector and control section 14 and the PWM section 18 is connected to the inverting input of IC U1, i.e., on pin 3. Thus, in response to control voltages from circuit 14 calling for the application of braking current, the collector of the internal op amp in IC U1 is pulled down and divided by potentiometer R3, current being applied through resistors R5 and R4 at a rate determined by the longer time constant of the dual-slope integrator 16. The output of the internal op amp in IC U1 appears on pin 4 thereof, which is thus affected by the time constant of the network including capacitor C3 and resistor R7, which forms a second integrator. Thus, initially, current is drawn out of the summing point represented by the inverting terminal of the internal op amp, whose output thus responds accordingly. The op amp output appearing on pin 4 is applied internally to a comparator which conducts a continuing comparison of that signal to a standard sawtooth wave form, so as to continually change the proportion of conduction. In accordance with the present application, a pulse-repetition rate of approximately 300 Hz is chosen, to best complement the braking systems being actuated (i.e., to best accommodate brake magnet performance with maximal isolation from natural mechanical resonances typically encountered). Accordingly, the output from the PWM (IC U1), appearing on pin 7, constitutes a repetitive pulse whose width is a function of the control signal from circuit portion 14, as a function of the internal comparison with the aforementioned sawtooth wave. This output from pin 7 is inverted through the analog switch stage 22 and applied to the gate of output MOSFET Q2

(and, where used, the second MOSFET Q3), to provide brakeactuating excitation on output conductor 26.

As noted above, previous systems have used PNP transistors with the emitter connected to battery positive and the collector to the brake magnets, which in turn connect to ground. The base drive is applied by pulling base current from the transistor to ground. The base current out of the base causes collector current to flow, thereby energizing the brake magnets. It would be somewhat analogous to this to use a P-channel MOSFET in such circumstances, since one could configure the circuit much the same as with the PNP transistor, with the source connected to battery positive and the drain connected to the brake magnets, which in turn connect to ground. However, P-channel MOSFETs of sufficiently low "on" resistance and current-handling capacity are simply not available as of this point in time. Paralleling higher-resistance devices would work, but the cost would be prohibitive. Accordingly, the present invention utilizes an N-channel MOSFET, even though this requires a substantially different and more involved circuit configuration. The configuration required is that of a source-follower, but this configuration requires that the MOSFET gate always be driven positive with respect to the source in order to cause conduction. Because the source rises to very near battery positive when the MOSFET is turned on, it is necessary that the gate be driven to a potential greater than battery potential. That is, an N-channel MOSFET requires that the gate be driven positive with respect to the source to cause conduction of the MOSFET. In a normal grounded-source configuration, gate drive is simply applied from a normal five to twenty volt source. The load would then be connected between the drain and the positive supply, and power would be delivered any time the gate was above threshold. In the present case, it is required that the brake magnets operate against ground, mostly because of tradition in the automotive industry. The high end must therefore be driven positive with respect to battery potential.

Accordingly, where the preferred N-channel MOSFET devices are utilized, so as to provide maximum circuit efficiency and minimum losses, the operational parameters encountered in typical vehicle-trailer environments, involving a positive-ground twelve volt power supply, requires a pull-up, "flying" supply which in effect doubles the available voltage level to provide above-rail drive to the MOSFET gate. In the circuit configuration shown in FIG. 1, the MOSFET gate supply is referenced to the voltage applied to supply conductor 28, but at a level which is effectively increased through the operation of capacitor C4 and diode D6, which is series-connected in supply line 28. Thus, when output transistor Q2 (and Q3, where used) is non-conducting, capacitor C4 charges to the level present on conductor 28 through diode D6, through a charge path which includes the brake magnet coils L1. When the output transistors are turned on and conduct the supply effectively rises with the source because diode D6 then allows the positive terminal of capacitor C4 to "bootstrap" up to a value of twice the applied B+. Since the gate drive for output MOSFETs Q2 and Q3 is supplied from conductor 28, through resistors R13 and R14, the foregoing charge state of capacitor C4 causes a corresponding supply condition to be present as gate drive. Of course, other voltage-doubling circuits are known and could be used, but most others utilize more expensive components, e.g., transformers, etc., and, under the circumstances present in the use of the circuit under discussion, the logically-switched "floating" supply concept works well for the intended purpose.

In order to preclude capacitor C4 from fully discharging, and thereby losing drive, the duty cycle should be set to a level slightly less than full-cycle, to ensure time for capacitor recharge during the output transistor "off" time. Accordingly, it will be observed that capacitor C4, which serves to boost the operating level of the entire control circuit to a level essentially twice that of the B+ actually supplied, recharges through the tow vehicle ground circuit, i.e., through the brake magnets, since when the brake-energizing line 26 is driven in a negative direction, a current pulse is supplied to capacitor C4 through conductor 34 from floating ground conductor 30. When this is completed, i.e., when the cycle ends, the polarity of diode D6 causes the supply level to continue to increase. Accordingly, the inductive load comprising the brake-actuation electromagnet coils functions to provide a constant current flow through them which is a function of the "duty cycle" of the applied pulse, i.e., the pulse-width. The duty cycle control, in turn, is set up through resistor R11 and diode D5, plus resistor R6 and diode D3, which are coupled between pins 2 and 3 of the PWM IC U1 and the logic switch 22, the output from the PWM IC, on pin 7, being applied through logic switch 22 to the output transistors in stage 24. Thus, the circuit operates to inject current into pin 3 of the pulse-width modulator U1 when the duty cycle exceeds the selected level, and this reduces the pulse-width from the PWM stage. It is, in effect, negative feedback, which establishes the maximum duty cycle of circuit U1.

Circuit duty cycle as a function of output current is an important function played by the logic switch 22. Thus, when gate drive of output transistors Q2 and Q3 is applied using section U2c of logic switch 22, section U2b is turned off as a clamp and section U2d is turned on as a voltage sensor, being connected to brake actuation line 26 through conductor 36 to the common connection node of output transistors Q2, Q3, and conductor 26. This in effect senses the voltage across output transistors Q2 (and, where used, Q3), and applies the sensed voltage back as a signal to pin 6 of the PWM (i.e., integrated circuit U1). That voltage level is proportional to the current flow through the vehicle brakes, with a typical "on" resistance of an extremely low level. The sensed voltage drop across Q2 and Q3 should be referenced to the MOSFET source, and therefore both U1 and U3 are operated from the same flying supply, with their negative terminals common to the source. Because U2 is driven from U1, it also is referenced to the flying source. Accordingly, the pulse-width modulator 41 will turn off if current exceeds a pre-set limit, thereby establishing a selected duty cycle which corresponds directly to the level of current flow through the trailer brake electromagnets. Furthermore, such turnoff provides an effective short-circuit protection for the brake magnet actuation line. Accordingly, if the output transistors for any reason overheat and their conducting resistance rises accordingly, the current limit for excitation to the brake magnets will be cut back correspondingly, to maintain circuit performance.

The same voltage sensed and applied to the pulse-width modulator U1 as a measure of output current, as just described, is also applied to the display circuit 12, which preferably comprises an LED bar-graph driver U3, for example of the type known as an LM3914, which includes an internal voltage divider and a set of ten comparators. The resulting function is that as the voltage across output transistor Q2 increases during its operating cycle, in proportion to the current through the brakes, the bar-graph driver will progressively energize one after another of the LEDs which it controls (identified in FIG. 1 as LD1, LD2, etc.). Accordingly, the operator of the towing vehicle will have available a direct display of the magnitude of braking current actually being applied (as opposed to the level of voltage applied to the brakes, which is no indication whatever of the magnitude of the energizing current, as the connection to the brake-actuators may have been lost). Thus, for perhaps the first time, the vehicle operator is provided a direct measure of braking current and, at the same time, the LED display functions as a circuit-connection indicator since unlike a voltage-responsive indicator, the current-indicative LED display will of course never become illuminated in a situation where brake-energizing line 26 becomes broken, disconnected, etc., inasmuch as no current can flow through the output FETs under such circumstances and there can thus be no corresponding voltage drop across the FETs.

At the same time, it is desirable to provide a separate indicator to positively show the ongoing presence of an appropriate circuit connection to the trailer brake line, for the continuous reassurance of the operator, and this is accomplished in accordance with the invention by an additional LED, connected across the lamp driver circuit U3, represented in the drawing by LD11, which is preferably of a contrasting color to those directly driven by the lamp driver (e.g., green versus red). That is, LD11 is in effect in series with the supply energizing lamp driver U3 (through conductor 38 and the regulating diode Z1). Thus, if the trailer brake connection line 26 should become disconnected, lamp driver U3 will no longer draw its operating current from supply conductor 28, and indicating diode LD11 will no longer illuminate.

To briefly summarize, the initiation of braking current to the electric brake magnets occurs in response to either inertial sensing or manual control and comprises current pulses which occur at varying duty cycles but at a constant, predetermined frequency selected to complement that of the vehicle braking system. The duty cycle of the brake-actuation current pulses is a function of the magnitude of the control signal, i.e., either the magnitude of the braking inertia sensed or the magnitude of the signal produced by actuation of the manual control; at the same time, however, the maximum possible duty cycle is established at a level which protects the circuit components, in particular the output transistors. Further, however, the control signals which call for increasing braking levels are applied through an integrator which exhibits a first, more gradual, time constant during braking actuation, so as to ensure smooth and uniform application of brake magnet-energizing current, but the removal of brake-energizing current in response to a decrease or termination of control signal is accomplished in a much faster, essentially instantaneous manner, inasmuch as the controlling integrator is of dual-slope configuration.

Accordingly, the controller in accordance with FIG. 1 may be thought of as providing a functional analogue to previous controllers which were switched on and off by interconnection with the towing vehicle brake light circuit, even though this form of the control circuit deliberately avoids interconnection with such brake light circuit. The slower, initial slope of the dual-slope integrator 16 helps obviate the need for any interconnection to the towing vehicle brake light circuit for safety purposes, since even though the preferred inertial sensor identified hereinabove (i.e., that which is the subject of copending application Ser. No. 07/390,280) is substantially immune to erratic operation and inadvertent braking signal commands in response to merely rough roads and the like, the comparatively slow ramp-up and rapid ramp-down provided by the dual-slope integrator in accordance herewith will in effect delay and dissipate random, isolated inertially-sensed control signals, such as might result from rough roads and the like, integrating them over time while they occur and discharging the integration value rapidly, with the effect being substantially no braking applied to the trailer wheels under such conditions, where braking is in fact not desired.

Finally, it is to be pointed out once again that the manual control switch S1 results in circuit operation directly comparable to that caused by the inertial sensor, operating through phototransistor Q1, i.e., manual switch S1 parallels the phototransistor Q1 so that when the manual switch is actuated by the operator the control voltage applied to the pulse-width modulator U1, and the onset of the output from this circuit, will ramp-up in a gradual manner, increasing continuously throughout the period of time during which the manual switch is actuated, whereas the reverse effect occurs upon discontinuation of the manual control. That is, the braking effect will immediately decrease upon discontinuation of the manual control command. Of course, during the interval of manual control actuation, the LED readout of resulting brake-excitation current will continue to increase, each such individual LED indicating the application of an increased level of brake-energizing current.

In this connection, it will be appreciated that use of the preferred "touch pad"-type switch (e.g., membrane switch) offers a distinctively new and different form of trailer brake manual control, since unlike prior art systems, there is no mechanical switch response, no elongated switch "throw," etc., and instead the operator merely rests his fingers, under moderate pressure, upon the actuating membrane switch and, as a function of the length of time this occurs, the trailer brakes will be energized in a progressive manner. On the other hand, as soon as the operator's hand is lifted from the touch pad control, the trailer brake actuation ceases. Of course, just as the application of braking current in response to operation of manual switch S1 occurs in the same manner and at the same rate of increase as that resulting from inertial sensor operation, the system gain control implemented by potentiometer R3 affects ensuing circuit operation in the same manner regardless of which sensor calls for braking actuation. That is, potentiometer R3 acts to set the maximum level of circuit response available, and is used to coordinate braking operation of a given trailer with that of a given towing vehicle, i.e., the operator uses potentiometer R3 to set the level of full-scale or maximal braking response to a safe level, less than lock-up, in response to maximum tow vehicle inertia effects.

Figure 2:
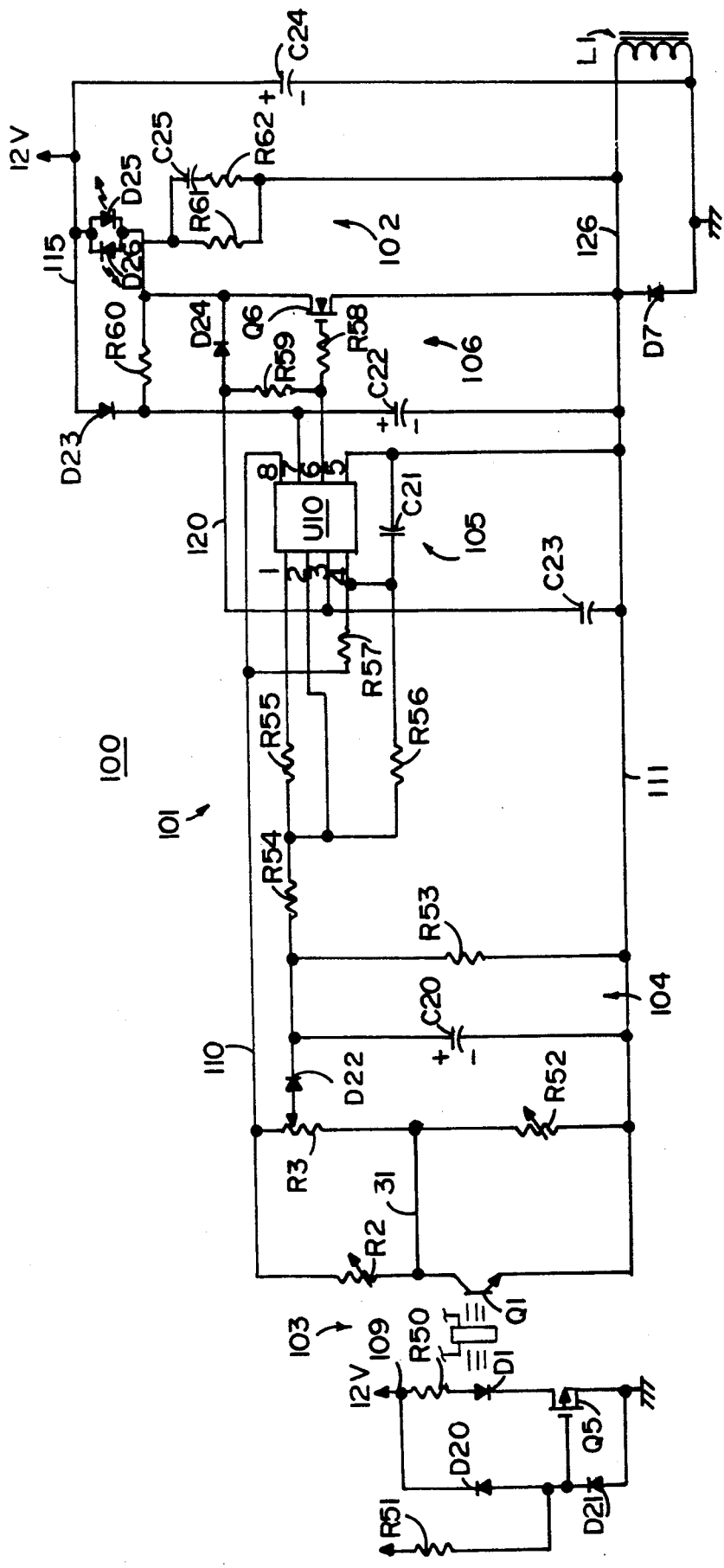
FIG. 2 is a schematic circuit diagram showing a second embodiment of an electronic controller in accordance with the invention.

With reference to FIG. 2, a circuit 100 embodying the concepts of the invention in an alternative and somewhat differing manner which provides certain significant economics generally includes a braking current control portion generally designated by the numeral 101 and a braking current display generation means generally designated by the numeral 102. Referring first to the braking current control portion of circuit 100, the control portion 101 generally includes a detection and control portion 103 shown at the left end and, proceeding toward the right, includes a coupling section 104, a variable pulse width modulator section 105, and an output stage 106 comprising a MOSFET element Q6. As shown, the output stage 106 has a conductor 126 which comprises the connection to the towed vehicle trailer brake actuator, again symbolized by the large inductive winding labelled L1. It will be understood that, as was indicated above with respect to FIG. 1, in actual practice there will be a number of individual such inductances in parallel, each comprising an electromagnet which actuates one set of brakes at one wheel, all wheels usually being controlled simultaneously and in a substantially identical fashion.

Referring to detection and control portion 103 of circuit 100, elements D1 and Q1 symbolize the signal-generating portions of the inertial sensor as noted above in connection with FIG. 1, which is most preferably in accordance with that described in copending application Ser. No. 07/390,280. While an appropriate signal could, of course be provided by other than electro-optical elements, the latter do provide a preferred embodiment of the invention, particularly in combination with the inertial sensor of the copending application just described. Thus in a preferred embodiment, element D1 comprises an infrared light emitting diode and element Q1 comprises a corresponding phototransistor. A resistor R50 connects the anode of diode D1 with a 12-volt battery terminal 109 and MOSFET Q5 is connected between the cathode of diode D1 and ground. The gate of MOSFET Q5 is connected to receive a brake signal from the towing vehicle via a resistor R51. MOSFET Q5 presents a high input impedance with approximately a Gigaohm of resistance and a few hundred picofarads of capacitance. The gate of MOSFET Q5 is thus connected via a 10KOhm resistor R51 in a manner which presents no significant load to the towing vehicle and prevents a signal being sent back to the stop light switch. This may be necessary to avoid interfering with other systems tied to the "cold" side of the stop light switch, such as a cruise control, an electronic engine control, and an anti-skid brake system.

As will be understood, the basic purpose of control portion 103 is to provide an analog control signal corresponding in magnitude to the extent of trailer braking desired, and thus an integral portion of control portion 103 is a manually-actuable control device, in this case represented by a slide potentiometer R52, by which the towing vehicle operator may manually initiate measured braking effects on the trailer whenever desired, apart from the operation of the towing vehicle brakes and the corresponding inertial effects. In the preferred commercial embodiment in accordance with FIG. 2, slide potentiometer R52 is a potentiometer of an appropriate commercially-available type. Apart from this, however, it will be observed that both the inertial sensor components and the manually-actuated components are effectively coupled between mutually-shared supply and ground conductors 110 and 111, respectively, through potentiometers R2 and R3, respectively, with an interconnecting line 31 extending between the lower-voltage side of each such potentiometer. As will be understood, potentiometer R2 is merely for the purpose of adjusting the operational range of the phototransistor Q1, to avoid circuit performance variation as a function of manufacturing tolerances in the optical components. Potentiometer R3, on the other hand, comprises a gain control for the entire control circuit 100, since it acts to set the level at which signals from the detection portion 103 are provided to the integrator portion 104.

Detection and control portion 103 of circuit 100 includes a diode D20 connected between the gate of MOSFET Q5 and 12-volt battery terminal 109, and a diode D21 connected between the gate of MOSFET Q5 and ground potential. Diode D20 is biased to prevent the gate of MOSFET Q5 from exceeding approximately 12 volts. Diode D21 is connected between the gate of switch Q5 and ground to prevent the gate from going below approximately ground potential. Diodes D20 and D21 accordingly insure that the gate of MOSFET Q5 remains within a desired operating range.

The coupling portion 104 of circuit 100 comprises basically a capacitor C20 connected to potentiometer R52 through a diode D22. Diode D22 holds the postive plate of capacitor C20 0.6 volts below the wiper of resistor R3 when phototransistor Q1 and slide-pot R52 are not engaged. When either slide-pot R52 or phototransistor Q1 are engaged to lower the potential on conductor 31, diode D22 is reversed biased. A resister R53 is connected in parallel with capacitor C20 such that when diode D22 is reverse-biased, capacitor C20 discharges through resistor R53. Thus, in the embodiment of FIG. 2, the capacitor C20 of the coupling portion will charge faster than it discharges, it being understood that coupling portion 104 is used with an inertial sensor connected to the brake lights and a manual slide potentiometer. Of course, a dual-slope integrator as described above, which charges faster than it discharges, is preferably utilized where the inertia sensor operates independent of the towing vehicle's brake lights, and where the manual touch pad switch is provided.

The pulse-width-modulator portion 105 of control circuit 101 receives an output of coupling portion 104 which is coupled via a resister R54 to an input pin 2 of integrated circuit U10. Integrated circuit U10 is utilized as a comparatively simple pulse-width-modulator and may be implemented by the use of commercial IC No. 3843 manufactured by Unitrode. As utilized in the present application, the inverting input of the internal operational amplifier (pin 2) is coupled to coupling portion 104, and particularly to the high side of capacitor C20, via resistor R54. An output of such internal comparator amplifier is provided at pin 1, which is connected via resistor R55 to pin 2. A resistor R56 and capacitor C21 are connected in series between a junction of resistors R54 and R55 and floating ground 111. A junction of resistor R56 and capacitor C21 is connected to the supply terminal 110 via a resistor R57. The junction of resistor R56 and capacitor C21 is also connected to pin 4 of integrated circuit U10. Pin 4 is a control input for an internal oscillator which provides timed pulses for the pulse-width modulation. The duty cycle of the pulse-width modulator must be held below a maximum threshold in order to prevent capacitor C22 from totally discharging during braking. Capacitor C21 and resistor R57 are selected to form an internal saw-tooth-oscillator which has a duty cycle set by the values of these elements. For example, capacitor C21 may be selected to be 0.27 uF and resistor R57 may be selected to be 22KOhm. Integrated circuit U10 includes an output pin 8 providing a regulated voltage on supply 110 which is 5 volts above pin 5. Conductor 111 functions as a floating ground, and is coupled to pin 5 of integrated circuit U10. Power is supplied to integrated circuit U10 through pin 7. The primary output from integrated circuit U10 appears on pin 6 thereof, and this is coupled to the gate of MOSFET element Q6. Output pin 6 is also connected via a resistor R59 to input pin 3 of integrated circuit U10. A capacitor C23 is connected between input pin 3 and floating ground 111 to act as an integrator, to keep voltage spikes off of pin 3, and a diode D24 is reverse-biased to isolate pin 3 from the 12-volt- battery supply when output pin 6 is low. The use of resistor R59 and diode D24 in combination with IC No. 3843, which use is believed to constitute a novel and desirable feaure, allows the integrated circuit comprising switches U2a, U2b, U2c, and U2d (FIG. 1.) to be eliminated from the control circuit. This reduction in parts is due in part to the characteristics of the signal on output pin 6 of IC No. 3843 and results in a significant reduction in the total control circuit cost. Pin 3 is a control input for a second internal comparator in integrated circuit U10. The output of the latter comparator is used to drive control logic which controls the primary output pin 6 to receive a control signal either from a transistor connected to supply pin 7 or from a transistor connected to floating ground 5.

The output portion 106 of circuit 100, like that of circuit 10 described above, preferably includes an N-Channel device, whose use in this environment is accomplished, in the embodiment under consideration, by the use of floating-ground "flying" power supply which, in effect doubles the available power level, so as to make it possible to use N-channel MOSFET devices as output stage Q6 (for example, by use of the commercially-available N-channel device identified as #SMP50N05). A diode D23 connected in series with capacitor C22 provides the necessary "pull-up" circuit. As illustrated, diode D23 and capacitor C22 are connected across output stage Q6, and between the 12-volt supply 115 and floating ground 111, the latter in fact providing the excitation appearing on output conductor 126 noted previously, leading to the brake-actuation of electromagnets L1.

The display circuit 102 includes a resistor R60 connected to supply node 7 of integrated circuit U10. A green LED D25 is connected back-to-back with a red LED D26. LED D25 and LED D26 are most preferably provided as an integrated package wherein the LEDs are connected back to back and directly adjacent one another. However, an appropriate color output may be provided by physically locating two LEDs directly adjacent one another. The anode of the green LED and the cathode of the red LED are connected to the 12-volt battery terminal. The cathode of the green LED and the anode of the red LED are connected to resistor R60. A series connection of a capacitor C25 and a resistor R62 is connected between resistor R60 and floating ground 111 to provide a current spike to LED D26, so that when braking is initiated, the red LED will show a brighter red. A resistor R61 is connected in parallel with the series connection of capacitor C2 and R62.

Somewhat more particularly, the operation of circuit 100 will now be described with reference to FIG. 2. Internally, the non-inverting input (pin 2) of the operational amp in integrated circuit U10 is tied to a 2.5 volt reference and, as noted above, the coupling portion 104 connected between the detector and control section 103 and the PWM section 105 is connected to the inverting input of IC U10, i.e., on pin 2. Thus, in response to control voltages from coupling circuit 104 calling for the application of braking current, current is pulled out of the inverting input of the internal op amp in IC U10, i.e., pin 2 is pulled down, current being applied to U10 through resistors R54 and R56. The output of the internal comparator in IC U10 appears on pin 1 thereof. Thus, initially, current is drawn out of the summing point represented by the inverting terminal of the internal op amp, whose output on pin 1 responds accordingly. A signal proportional to the op amp output appearing on pin 1 is applied internally to a comparator which conducts a continuing comparison of the signal at pin 3 and the proportional signal, so as to continually change the proportion of conduction. Accordingly, the output from the PWM (IC U10), appearing on pin 6, constitutes a repetitive pulse whose width is a function of the control signal from circuit portion 104. This output from pin 6 is applied to the gate of output stage MOSFET Q6 to provide brake-actuating excitation on output conductor 26.

As noted above, previous systems have used PNP transistors, with the emitter connected to battery positive and the collector to the brake magnets, which in turn connect to ground. It would be somewhat analogous to this to use a P-channel MOSFET in such an application, since one could configure the circuit in a manner generally similar to that used with the PNP transistor; however, P-channel MOSFETs of sufficiently low "on" resistance and current-handling capacity are simply not available as of this point in time. Thus, as explained above in connection with FIG. 1, the present invention utilizes an N-channel MOSFET, even though this requires a source-follower configuration, in which the MOSFET gate must be driven positive with respect to the source in order to cause conduction. Because the source rises to very near battery positive when the MOSFET is turned on, it is necessary that the gate be driven to a potential greater than battery potential. In the present case, it is required that the brake magnets operate against ground, mostly because of tradition in the automotive industry. The high end must therefore be driven positive to battery potential.

Accordingly, where the preferred N-channel MOSFET devices are utilized, the operational parameters encountered in typical vehicle-trailer environments requires a pull-up, "flying" supply which in effect doubles the available voltage level to provide above-rail drive to the MOSFET gate. In the circuit configuration shown in FIG. 2, the MOSFET gate supply is referenced to the voltage applied to supply conductor 115, but at a level which is effectively increased through the operation of capacitor C22 and diode D23, which are series-connected to supply line 115. Thus, when output MOSFET Q6 is non-conducting, capacitor C22 charges to the level present on conductor 115 through diode D23, through a charge path which includes the brake magnet coils L1. When the output MOSFET is turned on and conduct, the supply effectively rises with the source because diode D23 then allows the positive terminal of capacitor C22 to "bootstrap" up to a value of twice the applied voltage. Since the gate drive for output MOSFET Q6 is supplied from pin 7 to pin 6 of IC U10, and then through resistor R58, the foregoing charge state of capacitor C22 causes a corresponding supply condition to be present as gate drive. Of course, other voltage-doubling circuits are known and could be used, but most others utilize more expensive components, e.g., transformers, etc., and, under the circumstances present in the use of the circuit under discussion, the logically-switched "floating" supply concept works well for the intended purpose.

In order to preclude capacitor C22 from fully discharging, and thereby losing drive, the duty cycle should be set to a level slightly less than full-cycle, to ensure time for capacitor recharge during the output MOSFET off time. Accordingly, it will be observed that capacitor C22, which serves to boost the operating level of the entire control circuit to a level essentially twice that of the voltage on 115 actually supplied, recharges through the tow vehicle ground circuit, i.e., through the brake magnets, since when the brake-energizing line 126 is driven in a negative direction, capacitor 22 initially receives a current pulse from floating ground conductor 111. When the cycle ends, the polarity across diode D23 causes the supply level to continue to increase. Accordingly, the inductive load comprising the brake-actuation electromagnet coils functions to provide a constant current flow through them which is a function of the "duty cycle" of the applied pulse, i.e., the pulse-width. The duty cycle control, in turn, is set up through resistor R57 and diode C21, which are coupled between pins 8, 4 and 5 of the PWM IC U10, the output from the PWM IC, on pin 6, being applied through resistor R59 to pin 3. When the output on pin 6 provides gate drive signal to MOSFET element Q6, diode D24 will be forward-biased to provide an indication of braking current supplied to the brakes. Thus, the circuit operates to inject current into pin 3 of the pulse-width modulator U10 to indicate when the duty cycle exceeds the selected level, and this reduces the pulse-width from the PWM stage.

When diode D24 is forward-biased by output pin 6 going high, pin 3 of the PWM in effect senses the voltage across output MOSFET Q6 (minus the diode drop across diode D24 . That sensed voltage level is proportional to the current flow through the vehicle brakes. As current is supplied to the brakes by MOSFET Q6, the signal on pin 3 will ramp up until it exceeds the selected level which is proportional to the signal on pin 1. Accordingly, the pulse-width modulator U10 will turn off if current exceeds a pre-set limit, thereby establishing a selected duty cycle which corresponds directly to the level of current flow through the trailer brake electromagnets. If the internal oscillator times out before pin 3 exceeds the signal proportional to the signal on pin 1, the output will turn off to insure that capacitor C22 discharges. Such turnoff provides an effective short-circuit protection of the brake magnet actuation line. Accordingly, if the output MOSFET for any reason overheats and the conducting resistance rises accordingly, the current limit for excitation to the brake magnets will be cut back correspondingly, to maintain circuit performance.

The voltage across MOSFET element Q6 is applied to the display circuit 102, which preferably comprises red and green LEDs connected back to back and physically located directly adjacent one another. The resulting function is that as the voltage across output MOSFET Q6 increases during its operating cycle, in proportion to the current through the brakes, the color output provided by the visual indicator comprising the two LEDs D25 and D26 will progressively change. Thus, the vehicle operator is provided a measure of the pulse-width output on pin 6 of IC U10 providing an indication of braking magnitude at a significant economic savings.

At the same time, it is desirable to provide a separate indicator to positively show the ongoing presence of an appropriate circuit connection to the trailer brake line, for the continuous reassurance of the operator, and this is accomplished in accordance with the invention by green LED D25. Of course any color LED could be used, and green is merely offered as an example. If the trailer brake connection line 126 should become disconnected, indicating diode LED D25 will no longer illuminate.

To briefly summarize the embodiment illustrated in FIG. 2, the initiation of braking current to the electric brake magnets occurs in response to either inertial sensing in combination with towing brake light actuation or manual control, and comprises current pulses which occur at varying duty cycles but at a constant, predetermined frequency selected to complement that of the vehicle braking system. The duty cycle of the brake-actuation current pulses is a function of the magnitude of the control signal, i.e., either the magnitude of the braking inertia sensed or the magnitude of the signal produced by actuation of the manual control; at the same time, however, the maximum possible duty cycle is established at a level which protects the circuit components, in particular the output MOSFET transistors.

The system gain control implemented by potentiometer R52 effects ensuing circuit operation in the same manner regardless which sensor calls for braking actuation. That is, potentiometer R52 acts to set the maximum level of circuit response available, and is used to coordinate braking operation of a given trailer with that of a given towing vehicle, i.e., the operator uses potentiometer R52 to set the level of full-scale or maximal braking response to a safe level, less than lock-up, in response to maximum tow vehicle inertia effects.

In connection with the operation of the visual display provided by diodes D25 and D26, it will be seen that when the output at terminal 7 of U10 goes above 12 volts, diode D23 will be biased off, which will cause the potential across R60 to turn on red LED 26. The amount of braking applied will determine how long diode D26 is held on. As the degree of braking increases, the amount of time diode D26 is held on and diode D25 is held off will increase. Thus, the composite, resultant color presented by the combination of diodes D26 and D25 will progressively change. When no braking is applied, diode D25 is biased on and provides a green light. As braking is applied, the effective, composite color output from the two LEDs will change to yellow. As braking is increased, the color will change to amber, then red and finally crimson. Thus, an easily discernible color variation is provided which is proportionate to output braking.

Figure 3:
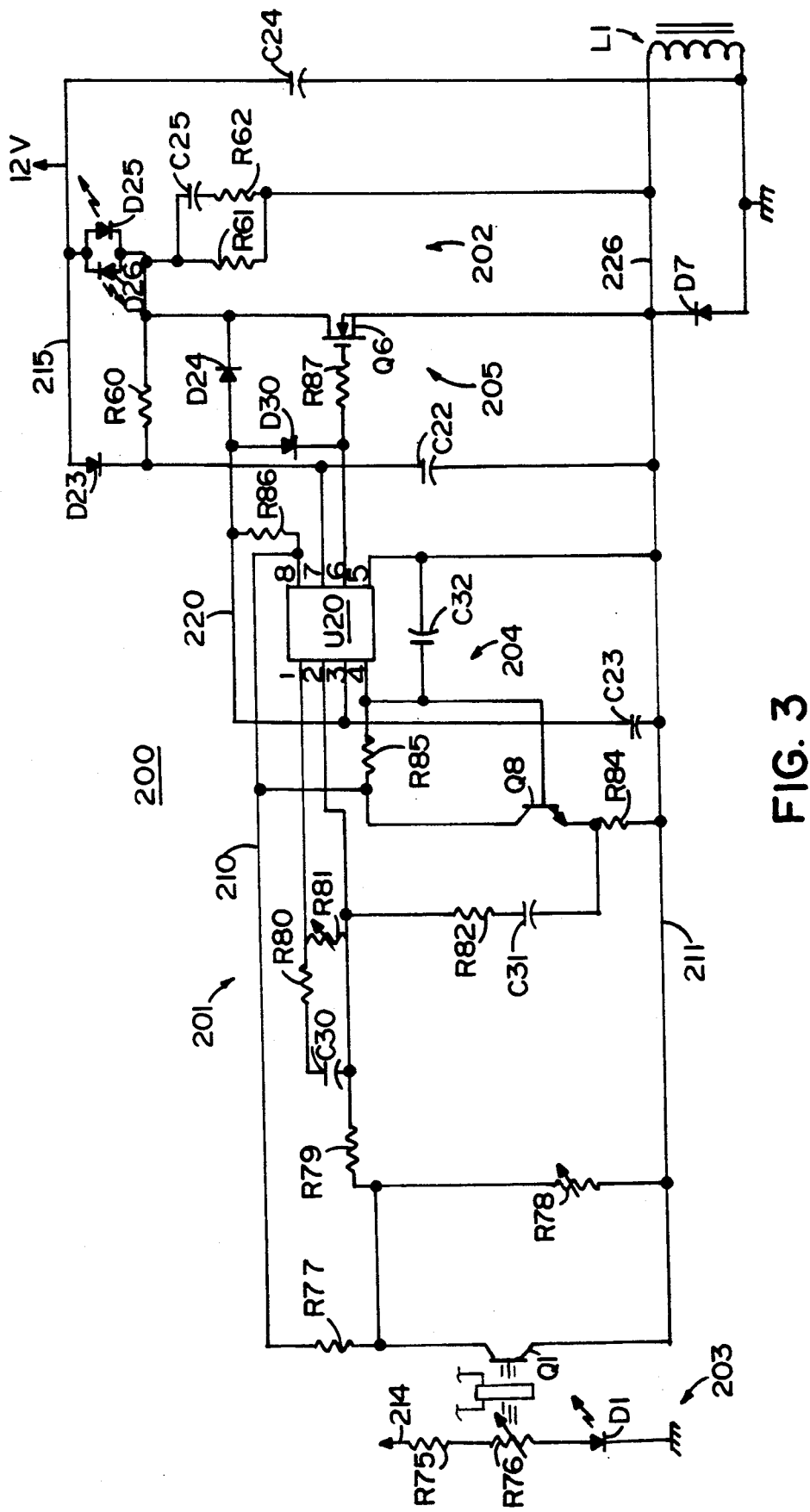
FIG. 3 is a schematic circuit diagram showing a further embodiment of an electronic controller in accordance with the invention.

With reference to FIG. 3, a further embodiment of the invention comprising circuit 200 generally includes a braking current control portion generally designated by the numeral 201 and braking current display generation means generally designated by the numeral 202. Referring first to the braking current control portion of circuit 200, the control portion 201 generally includes a detection and control portion 203 shown at the left end and, proceeding toward the right, includes a variable pulse-width-modulator section 204, and an output stage 205 comprising a MOSFET element Q6. The output stage 205 has a conductor 226 which comprises the connection to the towed vehicle trailer-brake actuator here symbolized by the large inductor winding labelled L1. As indicated above with respect to FIG. 1 and FIG. 2, it is to be understood that in actual practice a number of such inductances will be connected in parallel, each comprising an electromagnet which actuates one set of brakes at one wheel.

Referring to detection and control portion 203 of circuit 200, elements D1 and Q1 symbolize the signal-generating portions of the inertial sensor as noted in the other figures, which is most preferably in accordance with that described in copending application Ser. No. 07/390,280. While a generally appropriate signal could, of course be provided by other than electro-optical elements, the latter do provide a preferred embodiment of the invention, particularly in combination with the inertial sensor of the copending application just described. Thus in a preferred embodiment, element D1 comprises an infrared light-emitting diode and element Q1 comprises a corresponding phototransistor. A series connection of resistor R75 and potentiometer R76 connects the anode of diode D1 with the stoplights of the towing vehicle through terminal 214. The cathode of diode D1 is coupled to ground potential.

As will be understood, the basic purpose of control portion 203 of circuit 200 is to provide an analog control signal corresponding in magnitude to the extent of trailer braking desired, and thus an integral part of control portion 203 is a manual control element such as a potentiometer R78, by which the towing vehicle operator may manually initiate measured braking effects on the trailer whenever desired, apart from the operation of the towing vehicle brakes and the corresponding inertial effects. In a preferred embodiment in accordance herewith, potentiometer R78 is a slide potentiometer of an appropriate commercially-available type. Apart from this, however, it will be observed that the inertial sensor component Q1 is coupled between supply and ground conductors 210 and 211, respectively through resistor R77. As will be understood, potentiometer R76 is merely for the purpose of adjusting the operational range of the photo-coupling between diode D1 and phototransistor Q1 to avoid circuit performance variation as a function of manufacturing tolerances in the optical components.

The pulse-width-modulator portion 204 of control circuit 201 receives an output of the detection and control portion 203 via a resistor R79 which is applied to an input pin 2 of integrated circuit U20. As with the embodiment of FIG. 2, IC U20 is utilized as a comparatively simple pulse-width-modulator and may be implemented by the use of commerical IC No. 3843 manufactured by Unitrode. As utilized in the embodiment of FIG. 3 in the present application, the inverting input of the internal operational amplifier of IC U20 (pin 2) is coupled to receive the output of detection and control portion 203 via resistor R79. An output of such internal comparator amplifier is provided at pin 1, which is connected via a DC feedback path of potentiometer R81, which is an adjustable DC gain control, and via an AC feedback path comprising the series connection of resistor R80 and capacitor C30, which sets the AC gain. The AC feedback path provided by resistor R80 and capacitor C30 provides lower impedance for AC signals, to reduce jitter in the circuit.

In circuit 200, a series-connected resistor R82 and DC blocking capacitor C31 are coupled between pin 2 of intergrated circuit U20 and the junction of a resistor R84 and transistor Q8, whose collector is coupled to supply line 210. Transistor Q8 is utilized to inject current to the summing junction at the inverting input of the internal comparator amplifier of integrated circuit U20, i.e., at pin 2. The junction of resistor R85 and capacitor C32 is connected to pin 4 of integrated circuit U20, which is the control input for an internal oscillator which provides timed pulses for the pulse width modulation. The duty cycle of the pulse-width modulator must be held below a maximum threshold to prevent capacitor C22 from totally discharging during braking. Capacitor C32 and resistor R85 are selected to form an internal saw-tooth oscillator which has a duty cycle set by the values of these elements. For example, capacitor C32 may be selected to have a 0.27 uF capacitance and resistor R85 may be selected to have a 22KOhm resistance.

Integrated circuit U20 includes an output on pin 8 which provides a regulated voltage on supply line 210 which is 5 volts above the level of pin 5. A resistor R86 is connected between pin 8 and conductor 220 to bias a diode D30 on when output pin 6 is low, i.e., pin 6 isn't providing a gate drive signal. Conductor 211 functions as a floating ground, and is coupled to pin 5 of integrated circuit U20. Power is supplied to integrated circuit U20 through pin 7. The primary output from integrated circuit U20 appears on pin 6 thereof, and this is coupled to the MOSFET element Q6 through resistor R87. Output pin 6 is connected via a diode D30 to input pin 3 of integrated circuit U20. A capacitor C23 is connected between input pin 3 and floating ground 211 to act as an integrator to keep voltage spikes off of pin 3, and a diode D24 is reverse-biased to isolate pin 3 from the 12-Volt battery supply when output pin 6 is low. The use of diode D24 and diode D30 in combination with IC No. 3843, which use is believed to constitute a novel and desirable feature itself, allows the integrated circuit comprising switches U2a, U2b, U2c, and U2d (FIG. 1) to be eliminated from the control circuit. Pin 3 is control input for a second internal comparator in integrated circuit U20. The output of the latter comparator is used to drive control logic which controls the primary output pin 6 to receive a signal from either a transistor connected to supply pin 7 or from a transistor connected to floating ground 211.

The output portion 205 of circuit 200 preferably includes an N-Channel device, whose use in this environment is accomplished, as discussed above by the use of a floating-ground "flying" power supply, which in effect doubles the available power level, so as to make it possible to use N-channel MOSFET devices as output stage Q6 (for example, by use of the commercially-available N-channel device identified as #SMP50N05). A diode D23 connected in series with capacitor C22 provides the necessary "pull-up" circuit. As illustrated, diode D23 and capacitor C22 are connected across output stage Q6, and between the twelve-volt supply line 215 and floating ground 211, the latter in fact providing the the excitation appearing on output conductor 226 noted previously, leading to the brake-actuation of electromagnets L1.

The display circuit 202 includes a resistor R60 connected to supply node 7 of integrated circuit U20. A green LED D25 is connected back-to-back with a red LED D26. The anode of the green LED and the cathode of the red LED are connected to the 12-volt battery terminal. The cathode of the green LED and the anode of the red LED are connected to resistor R60. A series connection of a capacitor C25 and a resistor R62 is connected between resistor R60 and floating ground 211. A resistor R61 is connected in parallel with the series connection of capacitor C25 and R62.

As will be understood, the operation of circuit 200 is comparable to that of circuit 100, discussed above, since many of the components and connections are the same. Accordingly, the output from the PWM (IC U20), appearing on pin 6, constitutes a repetitive pulse whose width is a function of the control signal from circuit portion 203. This output from pin 6 is applied to the gate of output stage MOSFET Q6 to provide brake-actuating excitation on output conductor 26. As noted above, the present invention preferably utilizes an N-channel MOSFET as output element Q6, even though this requires a substantially different and more involved circuit configuration; that is, where the preferred N-channel MOSFET devices are utilized, so as to provide maximum circuit efficiency and minimum losses, the operational parameters encountered in typical vehicle-trailer environments require use of a pull-up, "flying" supply which in effect doubles the available voltage level to provide above-rail drive to the MOSFET gate. In this regard, the circuit configuration shown in FIG. 3, is configured like that of circuit 100, described above, and thus operates in the same way. Similarly, the voltage across output MOSFET element Q6 is applied to the display circuit 102, which preferably comprises red and green LEDs D25 and D26 connected back to back. The resulting function is thus in accordance with that described above, in connection with FIG. 2, providing the operator of the towing vehicle with a direct display of the pulse-width output at pin 6 of the integrated circuit and, at the same time, the LED display functions as a circuit-connection indicator since the current-indicative green LED display will not become illuminated in a situation where brake-energizing line 226 becomes broken, disconnected, etc.

In PWM circuit 204, resistor RS6 and diode D30 have been provided in place of resistor R59 (FIG. 2). Resistor R86 provides forward bias for diode D30 which holds pin 3 low when output pin 6 of IC U20 is low, i.e., no gate drive signal is applied to MOSFET Q6. When output pin 6 goes high to apply a gate drive signal to pin 6, diode D24 will be biased on by the voltage applied across resistor R86 to supply a control signal to pin 3 which will control the pulse-width provided by pin 6 in a manner comparable to the operation of the circuit of FIG. 2.

It is to be understood that the use of a connection between the systems in accordance herewith and the towing vehicle brake lights, as illustrated in FIG. 2 and FIG. 3, is in essence optional. In many ways, it is prefereable to provide the inertial sensor independently of the towing vehicle brake lights as illustrated in FIG. 1. Of course, a dual-slope integrator as disclosed above should be provided when the inertial sensor is not connected to receive an enabling signal with the towing vehicle brake lights.

It is to be understood that the foregoing description of the preferred embodiments of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein, or may make various changes in structural details to the illustrated embodiments; for example, it is certainly possible to implement the dual-rate integrator in a variety of different ways, and indeed even the pulse-width modulator and the logic represented by analog switch 22, as well as the lamp-driver U3, could readily be implemented by microprocessor control, with appropriate programming. Those skilled in the art may devise an embodiment using portions of each of the different embodiments illustrated herein; for example the MOSFET brake light input of FIG. 2 may be used with the pulse-width-modulator control arrangement of FIG. 3; or the detection and control portion of 14 and the dual-slope integration section 16 of FIG. 1 may be used with the pulse-width modulation portions of FIG. 2 or FIG. 3. Accordingly, all such alternative or modified embodiments as utilize the underlying concepts of the invention and incorporate the spirit thereof are to be considered as within the scope of the claims appended herebelow, unless such claims by their language specifically state otherwise.

The embodiments of the invention in which an exclusive property or privilege is claimed are defined as follows.

1. In an electronic controller for electrically actuated vehicle brakes, of the type having means for producing control signals which are proportionally representative of the desired extent of vehicle braking and further having means for producing pulses of current which are proportionally representative of the magnitude of said control signals, for correspondingly energizing vehicle brake-actuation means, the improvement wherein said means for producing pulses of current includes a MOSFET element for energizing said brake-actuation means, a switch for selectively feeding a signal from a terminal of the MOSFET element, and an input to said means for producing pulses, said switch being coupled to said input and said terminal of said MOSFET element such that said switch isolates said input of said means for producing pulses from said terminal of said MOSFET element when the vehicle brake-actuation means are not being energized, said switch automatically coupling said MOSFET to said input of said means for producing pulses when said brake-actuation means are energized.

2. A controller according to claim 1, wherein said switch for selectively connecting comprises a diode.

3. A controller according to claim 2, wherein said diode is reverse-biased when the MOSFET element is not conducting, and said diode is forward-biased when the MOSFET element conducts to supply current to the vehicle brake-actuation means.

4. An electronic controller for controlling electrically-actuated brakes of a towed vehicle from a towing vehicle having brake lights which are energized in response to towing vehicle brake system actuation, comprising: a MOSFET element having a first input with high input impedance and a second input; means for coupling said first input to the towing vehicle brakelights, to apply a signal to said first input upon actuation of said brake lights; and an inertia sensor connected to the second input of said MOSFET, whereby the inertia sensor generates an output from the MOSFET corresponding to changes in the inertia of the towing vehicle detected by the inertia sensor only when the MOSFET is enabled by said signal applied upon actuation of the towing vehicle brake lights.

5. An electronic controller according to claim 4 wherein said MOSFET element has a gate coupled to the towing vehicle brake lights.

6. An electronic controller according to claim 4 wherein the inertia sensor includes an optical emitter coupled to one of the source and drain of the MOSFET.

7. An electronic controller according to claim 6, wherein said optical emitter comprises an infrared light-emitting diode, and wherein an infrared detector is coupled to selectively receive light emissions from said infrared light-emitting diode when the towing vehicle brakes are applied and a change in inertia of the towing behicle occurs.

8. An electronic controller according to claim 4, further including means for producing control signals which are proportionally representative of the desired extent of vehicle braking, means for producing pulses of current whose output is proportionally representative of the magnitude of said control signals for correspondingly energizing said towed vehicle brakes, and a MOSFET element for energizing the towed vehicle brakes by applying pulses of power thereto in response to said pulses of current.

9. In an electronic controller for electrically actuated vehicle brakes, of the type having means for producing control signals which are proportionally representative of the desired extent of vehicle braking and further having means for producing pulses of current whose duty cycle is proportionally representative of the magnitude of said control signals, for correspondingly energizing said vehicle brakes, the improvement comprising: a MOSFET element for providing energizing power to actuate said vehicle brakes in response to said control signals, and means responsive to said MOSFET providing energizing power to actuate said vehicle brakes for injecting current into said means for producing pulses to reduce the pulse-width of the pulses of current and thereby prevent the duty cycle of said MOSFET from exceeding a predetermined level.

10. A controller according to claim 9, wherein said means for injecting current includes a transistor.

11. A controller according to claim 10, further including an inertia sensor having an enabling switch connected in series with a manual control means and arranged to enable said control means in response to vehicle brake actuation signals, said manual control means arranged to control the perational characteristics of said inertia sensor to produce output signals for controlling the extent of vehicle braking.

* * * * *